Patented June 4, 1929.

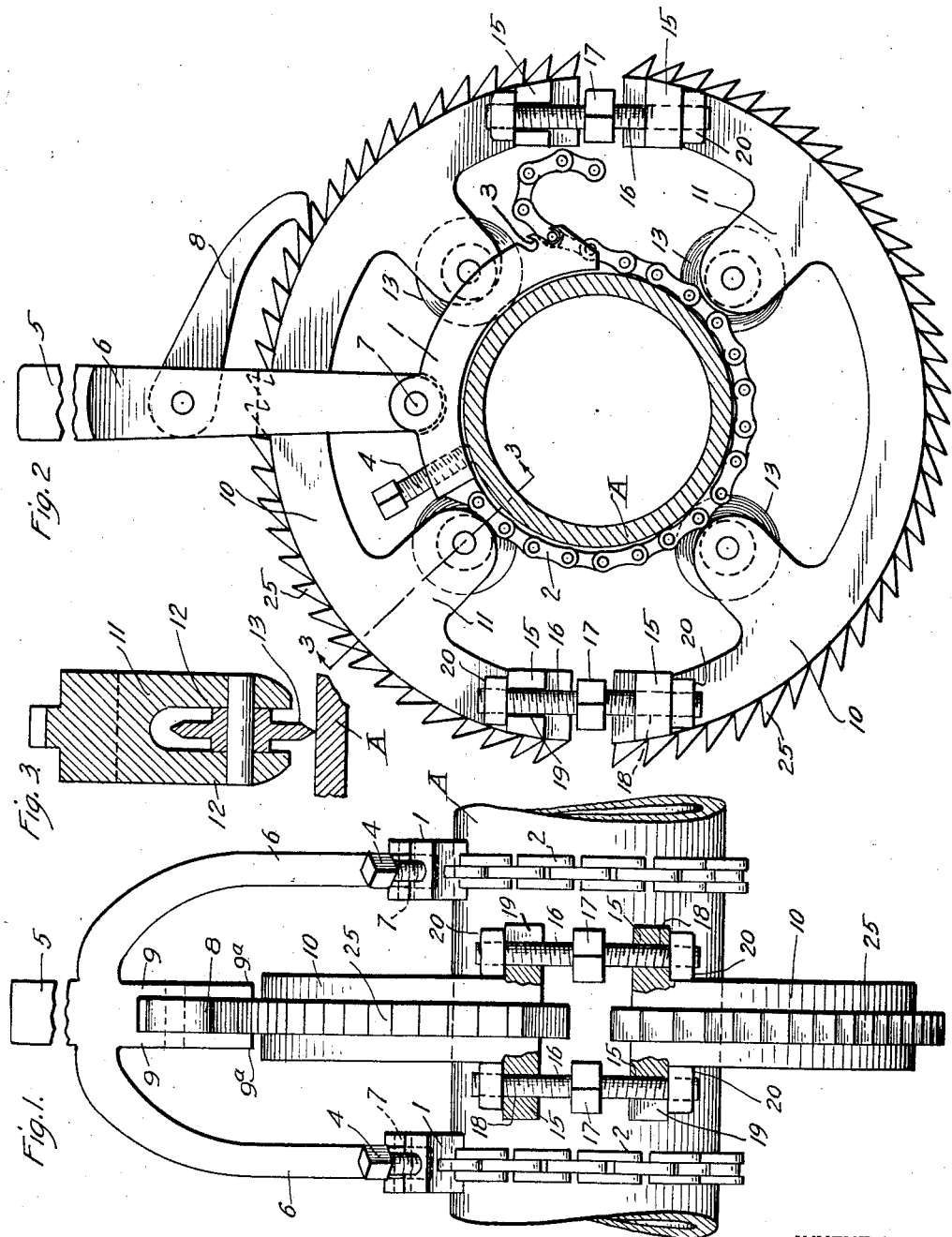

1,715,921

UNITED STATES PATENT OFFICE.

EDWARD E. HIMES, OF ALHAMBRA, CALIFORNIA.

PIPE CUTTER.

Application filed March 22, 1927. Serial No. 177,299.

This invention is a pipe cutter having a ratchet operating connection for revolving a cutting blade around a pipe; and it is the object of the invention to provide a quick-detachable engagement for clamping a supporting means on a pipe, and to revolve a cutter-frame relative to the support by means of a lever pivoted to the support and provided with a pawl adapted to operatively engage a ratchet on the cutter-frame.

It is a further object of the invention to provide a revolving cutter-frame carrying a plurality of rotatable cutters adapted to engage the pipe at such circumferentially spaced points as to maintain the frame concentric with the pipe, and to provide for ready mounting or disengagement and removal of the cutter-frame from the pipe.

It is a still further object of the invention to provide for convenient adjustment of both the supporting means and the cutter-frame so as to adapt the tool to pipes of various size, and to provide a guiding engagement between the support and the cutter-frame so as to maintain the desired alignment of the cutters relative to the pipe.

Further objects of the invention will be readily understood from the following description of the accompanying drawings, in which:

Fig. 1 is a front elevation of the tool mounted on a pipe.

Fig. 2 is a similar side elevation.

Fig. 3 is a detail section on the line 3—3 of Fig. 2.

A section of the pipe which is to be cut is shown at A, the cutting means comprising a support clamped on the pipe and an annular cutter-frame rotatable relative thereto by a pawl and ratchet actuating means.

The support, which is adapted for quick-detachable clamping engagement on pipe A, preferably comprises arcuate clamping dogs 1 spaced axially along the pipe and having grip-chains 2 which are adapted to encircle the pipe fixed to the dogs at one end with hooks 3 circumferentially spaced along the opposite ends of the dogs so that engagement of the various hooks by links of the loose ends of the chains will adjust the diameter of the resulting pipe-encircling means. The dogs 1 and their gripping chains encircling pipe A may be clamped tightly on the pipe by studs 4 threaded through the dogs and adapted to be tightened against the pipe for taking up slack.

A manual operating lever 5 rotates the cutter-frame of the tool, and for this purpose has a forked end 6 pivoted to the respective clamping dogs 1 as shown at 7, with a pawl 8 which is adapted to engage a ratchet on the cutter-frame pivoted in bearing plates 9 which depend from the lever between its forked ends.

The rotatable cutter-frame comprises arcuate sections 10, preferably two in number, fixed relative to one another so as to form an annulus which encircles pipe A between the axially spaced clamping means 1—2, with the forked end of the operating lever straddling the cutter-frame. The frame is radially spaced from pipe A, and its sections 10 have inwardly projecting circumferentially spaced lugs 11 which are forked as shown at 12 to form bearings for rotatable cutter discs 13 which engage the pipe to perform the cutting operation. The lugs 11 are so circumferentially spaced that the cutters engaging the pipe will maintain the cutter-frame concentric with the pipe to permit ready rotation of the frame.

The means for fixing the sections of the cutter-frame relative to one another are shown as adjusting bolts engaging lugs on adjacent ends of the two sections of the frame, the said lugs being preferably provided at both axial faces of the frame to insure a rigid structure. For this purpose lugs 15 project axially from both faces of sections 10 at their respective arcuate ends, and the alined lugs of the two sections are engaged by bolts 16 oppositely threaded at their respective ends and having intermediate heads 17 adapted for engagement by a suitable wrench.

One end of each bolt projects through a bore 18 in a lug of one of the sections 10, and the opposite end of the bolt is received in a recess 19 opening laterally through the corresponding lug of the other section 10, the bores 18 and recesses 19 being provided respectively in the lugs at opposite faces of each section 10 as shown in Fig. 1, so that the sections of the cutter-frame may be readily disengaged by relative axial movement permitting bolts 16 to slide in the lateral recesses 19. The ends of the bolts project beyond their cooperating lugs 15 and have nuts 20 threaded thereon, with the nuts held against turning by abutment against the faces of sections 10 as shown in Fig. 1, so that turning the bolts will radially adjust the sections of the cutter-frame relative to one another for engaging cutters 13 with pipe A.

The cutter-frame is rotated by the pawl 8 in order to cut the pipe by the rotatable cutters 13, and for this purpose the outer peripheral faces of sections 10 have a ratchet 25 formed thereon which is adapted for engagement by the pawl so that manual oscillation of lever 5 will rotate the cutter-frame. The bearing plates 9 for the pawl are preferably extended as shown in Fig. 1 to form guides 9ª which overlie the sides of ratchet 25 to maintain alinement of the operating lever and the rotatable cutter frame; and at their arcuate ends the medial portions of the peripheral faces of sections 10 on which the ratchet is formed, preferably project circumferentially beyond their lugs 15 so that the teeth on the respective sections 10 may be continued into close proximity to permit uninterrupted engagement of the ratchet by the actuating pawl and at the same time permit appreciable adjustment of sections 10 relative to one another to fit the cutter to different sizes of pipe.

The cutter as thus described is adapted for ready mounting or disengagement from a section of pipe, with the parts conveniently adjustable to fit different sizes of pipe; and the assembled device provides a practical tool whereby a cutter-frame may be rotated relative to a support fixed on the pipe, by means of a manually operable pawl and ratchet connection which positively guides the rotatable frame relative to the fixed support.

In operation the disengaged sections of the cutter frame are mounted on opposite sides of a pipe, and are then relatively laterally shifted so that bolts 16 are received in recesses 19 for assembling the sectional cutter frame; and by adjusting the bolts at both proximate ends of the arcuate frame sections, cutters 13 are moved into operative engagement with the pipe while the assembled cutter frame is maintained concentric with the pipe. The dogs 1 are then mounted on the pipe and clamped in position by chains 2 so that the forked end of the operating lever straddles the cutter frame with guides 9ª engaging the sides of ratchet 25 which is thus adapted for operative engagement by pawl 8. By operating the lever 5 the cutter frame is then rotated on the pipe to cause cutting engagement by the discs 13; and when the cutting operation is completed the cutter may be readily removed from the pipe by disengaging chains 2 and removing the operating lever, and then loosening bolts 16 so that the sections of the cutter frame may be relatively laterally shifted to disengage the bolts from recesses 19 and thus disconnect the frame sections for their separate removal.

I claim:

1. A pipe cutter comprising a cutter-frame adapted to encircle a pipe, a ratchet on the cutter-frame, an operating lever having an actuating connection with the ratchet for revolving the cutter-frame on the pipe, and a guide on the operating lever engaging the cutter-frame for alining the latter relative to the pipe.

2. A pipe cutter comprising a cutter-frame adapted to encircle a pipe and including arcuate sections, lugs on the respective axial faces of both arcuate sections at both their proximate ends, adjusting bolts engaging cooperating pairs of said lugs at both proximate ends of the arcuate sections, said lugs of the respective arcuate sections at both proximate ends thereof and at opposite faces of the cutter-frame being adapted for lateral disengagement of said bolts from the lugs by axial movement of one of said arcuate sections with relation to the other, and means for causing relative rotation between the cutter-frame and the pipe.

3. A pipe cutter comprising a cutter-frame adapted to encircle a pipe, a ratchet on the cutter-frame, gripping means encircling the pipe, an operating lever mounted on the gripping means and having an actuating connection with the ratchet for revolving the cutter-frame on the pipe, and a guide on the operating lever engaging the cutter-frame for alining the latter relative to the pipe.

In testimony whereof he has affixed his signature to this specification.

EDWARD E. HIMES.